United States Patent [19]

Kurtz et al.

[11] Patent Number: 4,476,726
[45] Date of Patent: Oct. 16, 1984

[54] PRESSURE TRANSDUCERS EXHIBITING LINEAR PRESSURE OPERATION

[75] Inventors: Anthony D. Kurtz, Englewood; Joseph R. Mallon, Franklin Lakes; Timothy A. Nunn, Ridgewood, all of N.J.

[73] Assignee: Kulite Semiconductor Products, Inc., Ridgefield, N.J.

[21] Appl. No.: 409,537

[22] Filed: Aug. 19, 1982

[51] Int. Cl.³ .............................................. G01L 9/06
[52] U.S. Cl. ....................................... 73/708; 73/721; 73/727
[58] Field of Search .................. 73/720, 721, 726, 727, 73/708, DIG. 4, 765, 766

[56] References Cited

U.S. PATENT DOCUMENTS 4,050,313 9/1977 Shimada et al. ..................... 73/765
4,322,980 4/1982 Suzuki et al. ........................ 73/727

Primary Examiner—Donald O. Woodiel
Attorney, Agent, or Firm—Arthur L. Plevy

[57] ABSTRACT

A bridge array employing piezoresistive sensors responsive to the longitudinal piezoresistive effect generally exhibits a positive nonlinearity over a pressure range, while a bridge array employing piezoresistive sensors employing the transverse piezoresistive effect exhibits a negative nonlinearity over the pressure range. A composite pressure transducer is provided by interconnecting a longitudinal and transverse bridge array in a common composite configuration. The resulting transducer exhibits linear operation over the pressure range due to the cancellation of said nonlinearities from the connected arrays.

9 Claims, 4 Drawing Figures

PRESSURE TRANSDUCERS EXHIBITING LINEAR PRESSURE OPERATION

BACKGROUND OF INVENTION

This invention relates to pressure transducers and more particularly to compensating arrangements of such transducers in order to substantially reduce nonlinearities.

The use of the piezoresistive effect in semiconductors has made possible the construction of a wide variety of transducers which exhibit enchanced outputs and operating frequencies over a wide range of temperature and pressure conditions.

Such devices employ the most advanced techniques for fabrication as developed and utilized in the field of solid state technology. These techniques enable size reduction, excellent repeatability and reliability, high output, lower power dissipation, while providing an overall simplification of design and application.

In the semiconductor transducer the piezoresistive effect exhibited accounts for a change in the resistance of the strain gage in response to a change in pressure. In monolithic transducers the piezoresistive effect may be due to the longitudinal or transverse piezoresistive effect.

Apart from the advantages as described above, there is a problem associated with such transducers operating with either effect.

The combined effects of the nonlinearity of the pressure versus stress function of the mechanical element used as a force collector and the basic piezoresistive nonlinearity combine to produce a pressure sensor with a nonlinear behavior.

The longitudinal piezoresistive effect is widely used and most transducers in the prior art relied on this effect for operation. When employing the longitudinal effect, the transducers typically exhibit a positive nonlinearity over a pressure range. Essentially a transducer should operate to provide a linear output upon application of varying pressure. Over the full range of operation this should be a straight line between the end points as from zero applied pressure to full scale. Longitudinal devices usually exhibit a positive nonlinearity which provides a relatively straight line operation above the theoretical end points. The nonlinearity is due to many factors which prevent true end point operation as from zero to full scale.

For instance in a high pressure sensor shear stresses on the diaphragm support act to decrease stress levels at peripheral gage elements. In low pressure transducers membrane stiffening effects produce a positively nonlinear behavior. These effects combine with the inherently positive nonlinear response of a longitudinal piezoresistive element to produce a postively nonlinear pressure transducer.

Transducers employing transverse piezoresistive sensors however may be positively or negatively nonlinear. The basic transverse piezoresistive coefficient is negatively nonlinear for tensile stress and positively nonlinear for compressive stress. Thus, depending on the mechanical flexure nonlinearity and the placement and operating stress levels of the transverse elements a pressure sensor with a negatively nonlinear characteristic can be readily fabricated.

The pressure variations are in part due to the particular construction of the pressure responsive diaphragm as well as the construction of the individual sensors or gages. These variations of the output of the device with respect to pressure is not related to temperature and does not vary according to the same relationship as governing temperature changes. Hence the manufacturer desirably would like to compensate for these pressure variations and to eliminate the same. The elimination of such effects is extremely difficult. For example, there is variation in pressure transducers which manifests itself in a non-linear output voltage of one volt for an applied pressure of one psi. In this manner, the bridge should provide an output of one-half volt for an applied pressure of one-half psi. A typical piezoresistive bridge arrangement which is not compensated will not do this and will not provide a linear output pressure according to applied increments of reference pressure. This variation is not linear but is of the following relationship:

$$Y = AP + BP^2 + CP^3$$

where
  Y = output voltage of the bridge.
  P = applied pressure.
  A is a constant unique to the bridge configuration.
  B is another constant particular to the bridge configuration.
  C is a third constant particular to the bridge configuration.

As indicated there is great difficulty in compensating for such variations in pressure which cause the above described nonlinearities. For example, see U.S. Pat. No. 4,192,005 entitled COMPENSATED PRESSURE TRANSDUCER EMPLOYING DIGITAL PROCESSING TECHNIQUES issued on Mar. 4, 1980 to Anthony D. Kurtz and assigned to the assignee herein.

This patent describes the nonlinearities and operates a transducer in conjunction with digital processing circuitry to provide a compensated output over a wide range of both pressure and temperature.

As described above, transducers exhibiting the longitudinal piezoresistive effect exhibit a positive nonlinearity, while those employing the transverse piezoresistive effect exhibit a negative nonlinearity. The negative nonlinearity appears below the theoretical response line between end points while, as indicated, the positive nonlinearity is above the response line.

It is an object of this invention to provide a compensated transducer structure capable of providing an improved linearity over a wide range of pressure variations. The transducer to be described is simple to construct and fabricate and provides compensation over a wide pressure range.

BRIEF DESCRIPTION OF THE PREFERRED EMBODIMENT

A pressure transducer includes a first transducer assembly having a circular semiconductor diaphragm with a piezoresistive bridge array employing sensors arranged to respond according to the longitudinal piezoresistive effect. The bridge thus formed has the inputs connected to inputs of a second transducer assembly having a rectangular diaphragm with a piezoresistive bridge array employing sensors arranged to respond according to the transverse piezoresistive effect, one output lead is obtained from the first assembly and the second output lead from the second assembly, with the output of the connected assemblies exhibiting a linear response to pressure over the range of pressures applied to said composite device.

DETAILED DESCRIPTION OF DRAWINGS

Figure 1:
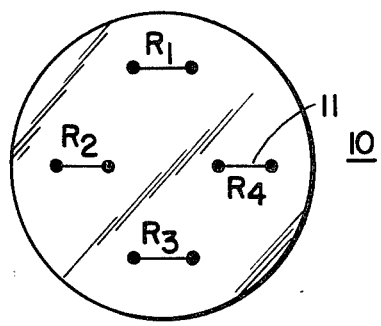
FIG. 1 is a top plan view of a pressure transducer operating according to a longitudinal piezoresistive effect.

Referring to FIG. 1, there is shown a transducer assembly 10 relying in operation on the longitudinal piezoresistive effect.

The transducer 10 includes a diaphragm 11 which is circular in shape and which is fabricated from a semiconductor material such as silicon. Positioned on the diaphragm are four sensors or piesoresistive elements designated as R1 to R4. The sensors may be diffused into the silicon diaphragm or otherwise positioned thereon by the use of a number of well known and conventional techniques employed in the semiconductor art. See for example, U.S. Pat. No. 3,654,579 entitled ELECTROMECHANICAL TRANSDUCER AND HOUSING issued on Apr. 4, 1972 to A. D. Kurtz, et al., U.S. Pat. No. 3,800,264 issued on Mar. 26, 1974 to A. D. Kurtz, et al. and entitled HIGH TEMPERATURE TRANSDUCERS AND HOUSING INCLUDING FABRICATION METHODS, U.S. Pat. No. 3,935,645 entitled METHODS OF FABRICATING INTEGRATED TRANSDUCER ASSEMBLIES issued on Feb. 3, 1976 to A. D. Kurtz, et al., U.S. Pat. No. 4,016,644 entitled METHODS OF FABRICATING LOW PRESSURE SILICON TRANSDUCERS, issued on Apr. 12, 1977 to A. D. Kurtz, et al. These patents, assigned to the assignee herein, as well as many other describe the fabrication of such transducers employing a host of different techniques.

Figure 3:
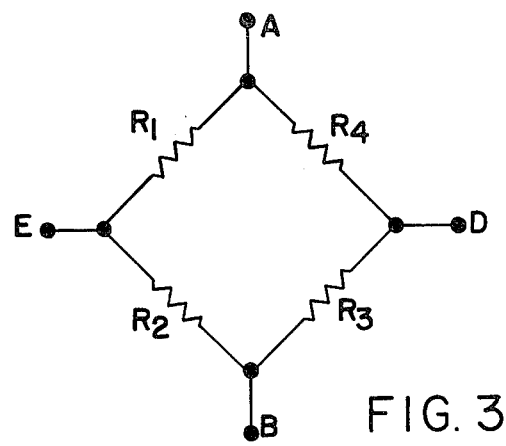
FIG. 3 is a schematic diagram of a bridge array employed in the transducer configurations of FIG. 1 and FIG. 2.

Thus in FIG. 1 the sensors Ri and R3 are located in the central portion of the diaphagm 11 and are in tension for the application of a force to the diaphragm. Sensors R2 and R4 are located near the outer rim of the diaphragm and are in compression on the application of an applied force. In the circular configuration depicted the sensors mainly employ the longitudinal piezoresistive effect. Thus as shown in FIG. 3 a Wheatstone or bridge array can be provided with sensors R1 to R4 connected as shown. With a biasing voltage applied to terminals A and B an output according to applied pressure can be taken across terminals E and D. In the longitudinal device as 10 of FIG. 1, there is typically positive nonlinearity characteristic with pressure. The longitudinal piezoresistive coefficient, is defined by $$[(\Delta P)/Po] = \pi_l t$$

where $\Delta p = p - p_o$ is resistively change ($p_o$ = zero stress resistivety) for the case in which the electric field, the current, and a simple tensile or compressive stress are in the same direction. The value of $\pi_l$ depends on the direction in the crystal.

Figure 2:
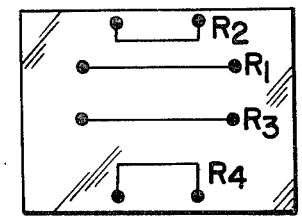
FIG. 2 is a top plan view of a pressure transducer operating according to a transverse piezoresistive effect.

Referring to FIG. 2, there is shown a transducer assembly relying in operation on the transverse piezoresistive effect. In order to enhance operation in the transverse mode and to provide for a transducer of a negative nonlinearity the diaphragm and pattern shown are particularly appropriate for high pressure operation with negative nonlinearity. The sensors are again designated as R1 to R4 and are arranged in the configuration of FIG. 3. In this arrangement sensors R1 and R3 are in the center, while R2 and R4 are on the periphery. The stress is developed along the major axis of the diaphragm and the sensors respond according to the transverse effect. The transverse piezoresistive constant $\pi_t$ is defined by an equation similar to that for $\tau_l$. However, the simple tensile or compressive stress is now normal to the current. For examples of such operation and the fabrication of other arrangements of transducers employing the transverse effect reference is made to an application note KPS AN-10 published by Kulite Semiconductor Products, Inc., of Ridgefield, N.J. the assignee herein and to a paper included therein entitled SEMICONDUCTOR TRANSDUCERS USING TRANSVERSE AND SHEAR PIEZORESISTIVE by A. D. Kurtz, et al. The paper also was published by the Instrument Society of America, 22nd annual ISA Conference and Exhibit, Sept. 11 to 14, 1967, Chicago, Ill. as preprint number P4-1-PHYMMID-67.

As has been stated, the transverse transducer array exhibits a negative nonlinearity as opposed to the positive nonlinearity of the longitudinal array.

Figure 4:
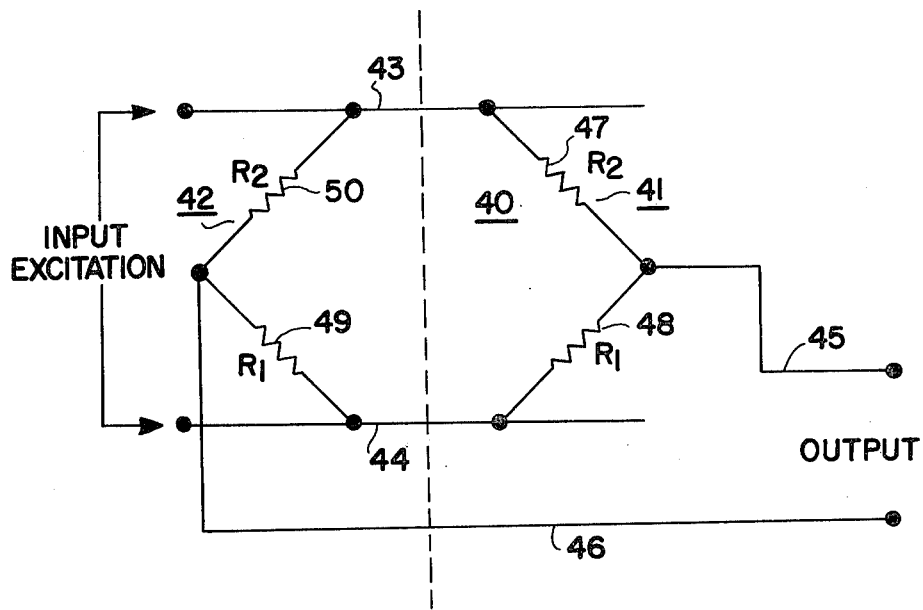
FIG. 4 is a schematic diagram of a pressure transducer according to this invention.

Referring to FIG. 4, there is shown a compensated composite transducer structure 40 according to this invention employing a longitudinal array 41 as in FIG. 1 having inputs in parallel with a transverse array 42 as in FIG. 2.

The input terminals of each transducer array are connected together via leads as 43 and 44 to form common input terminals for applying a biasing source thereto. The output of the array is taken between terminals 45 and 46, with terminal 45 connected to the junction between resistors 47 and 48 of the longitudinal array (corresponding to R1 and R2), while terminal 46 is connected to the junction between resistors 49 and 50 (corresponding to R1 and R2) of the transverse array. Of course, resistors R3 and R4 could also be employed as they are provided for redundancy and to increase diaphragm yield. The gage factors of each array are selected to be the same or relatively close. The arrays may be fabricated during the same process and hence employ the same material for the diaphragm as silicon from the same batch. In the configuration shown the positive nonlinearity of the longitudinal array 41 is made to compensate the negative nonlinearity of the transverse array 42 by appropriate choice of diaphragm geometry and dimensions along the appropriate placement of the piezoresistive elements. Thus voltage output across terminals 45 and 46 as a function of pressure exhibits relatively no nonlinearity due to pressure. The dashed line indicates that each array is fabricated on a separate chip and the chips are then connected together as shown. The composite structure shown in FIG. 4 constitutes a Wheatstone bridge with two resistors (R1 and R2) selected from each array 41 and 42. While it is shown to employ separate devices and connect them, it may be desirable to fabricate the transverse and longitudinal array from the same slice of silicon or other suitable semidonductor material. Fabricating the devices independently gives the transducer designer a large degree of freedom in making a transducer of a given pressure range because the individual diaphragm thickness can be chosen to exactly compensate for individual nonlinearities. When the diaphragm thickness is changed, the nonlinearity varies but most importantly the contribution to the total output changes so that by careful control the magnitude of compensation of the positive and negative nonlinearities can be adjusted to exactly match and thus achieve a linear structure. Of course once chosen for a given pressure range or application, the appropriate diaphragm geometry for the longitudinal and transverse transducer can be incorporated onto a single mesh and fabricated as a single unit thus reducing the cost and also the number of required interconnections.

We claim:

1. A pressure transducer, comprising:
    a first transducer assembly comprising a semiconductor diaphragm of a circular configuration having a plurality of pressure sensitive resistors located thereon, with said resistors relying on the piezoresistive effect to provide a change in resistance according to the magnitude of force applied to said diaphragm, of a given nonlinearity
    a second transducer assembly comprising a semiconductor diaphragm of a rectangular configuration having a plurality of pressure sensitive resistors located thereon, with said resistors relying on the piezoresistive effect to provide a change in resistance according to the magnitude of force applied to said diaphragm, to produce an output with a nonlinearity opposite to the above said nonlinearity and means connecting said piezoresistive elements of said first and second assemblies together to form a composite transducer with a minimum nonlinearity.

2. The transducer according to claim 1, wherein the first assembly utilizes the longitudinal piezoresistive effect and the second assembly utilizes the transverse piezoresistive effect.

3. The pressure transducer according to claim 1, wherein said plurality of pressure sensitive resistors associated with said first and second assemblies are a Wheatstone bridge configuration.

4. The pressure transducer according to claim 3, wherein each of said first and second assembly includes four piezoresistive elements with two exhibiting tension and two in compression upon application of said force.

5. The pressure transducer according to claim 1, wherein said diaphragms associated with said first and second transducer assemblies are fabricated from silicon.

6. The pressure transducer according to claim 5, wherein said silicon employed for said diaphragms is from a common slice of silicon.

7. The pressure transducer according to claim 1, wherein said first transducer assembly exhibits a positive nonlinearity characteristic and said second transducer assembly exhibits a negative nonlinearity characteristic.

8. The pressure transducer according to claim 1, wherein said pressure sensitive resistors associated with said first and second assemblies are diffused into said semiconductor diaphragms.

9. The pressure transducer according to claim 1, wherein said first transducer assembly includes two resistors, and said second transducer assembly includes two resistors, with said resistors connected together to form said composite transducer of a Wheatstone bridge array.

* * * * *